United States Patent
Shiga et al.

(10) Patent No.: US 6,620,553 B2
(45) Date of Patent: Sep. 16, 2003

(54) LITHIUM SECONDARY BATTERY

(75) Inventors: Tohru Shiga, Aichi (JP); Akihiko Koiwai, Aichi (JP); Shigehiro Kawauchi, Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 212 days.

(21) Appl. No.: 09/900,875

(22) Filed: Jul. 10, 2001

(65) Prior Publication Data

US 2002/0018926 A1 Feb. 14, 2002

(30) Foreign Application Priority Data

Jul. 10, 2000 (JP) ........................................ 2000-207939

(51) Int. Cl.$^7$ .............................................. H01M 10/40
(52) U.S. Cl. ........................ 429/303; 429/324; 429/338
(58) Field of Search ................................ 429/188, 303, 429/324, 327, 330, 331, 332, 333, 334, 335, 336, 337, 338, 347

(56) References Cited

U.S. PATENT DOCUMENTS

| 5,879,834 A | 3/1999 | Mao ........................... 429/197 |
| 6,074,777 A | 6/2000 | Reimers et al. ................ 429/61 |
| 6,077,628 A | 6/2000 | Takechi et al. |
| 6,235,431 B1 | 5/2001 | Takechi et al. |

FOREIGN PATENT DOCUMENTS

| JP | 62-160671 | 7/1987 |
| JP | 8-45545 | 2/1996 |
| JP | 11-339850 | 12/1999 |

*Primary Examiner*—Randy Gulakowski
*Assistant Examiner*—Monique Wills
(74) *Attorney, Agent, or Firm*—Oblon, Spivak, McClelland, Maier & Neustadt, P.C.

(57) ABSTRACT

A lithium secondary battery exhibiting very high safety, which is ensured by restraining both the generation of flammable gas caused by the decomposition of an electrolyte, and the emission of oxygen from a positive active material even during overcharging. The lithium secondary battery includes a positive electrode of which an active material is a lithium transition metal composite oxide, a negative electrode of which an active material is a carbon material, and a nonaqueous electrolyte containing an organic solvent in which a lithium salt is dissolved. The nonaqueous electrolyte contains at least one kind of conductive polymer-forming monomers which have an alkyl group and is electrochemically polymerizable on the positive electrode within a battery operation voltage, and at least one kind of film-forming agents which electrochemically decompose within the battery operation voltage to form films on a surface of the negative electrode.

15 Claims, No Drawings

LITHIUM SECONDARY BATTERY

BACKGROUND OF THE INVENTION

1. Field of the Invention

The present invention relates to a lithium secondary battery using dope and undope phenomena of lithium and, more particularly, to an improvement of a nonaqueous electrolyte composing the lithium secondary battery.

2. Description of Related Art

Recently, in consideration of environmental problems such as air pollution, electric cars and hybrid cars tend to become popular, and accordingly, batteries as electric sources of these cars have been required to exhibit high performance. Lithium secondary batteries including positive electrodes of which active materials are lithium transition metal composition oxides, negative electrodes of which active materials are carbon materials, and nonaqueous electrolytes have a characteristic of high energy densities, and accordingly, the lithium secondary batteries have been greatly expected as high-performance batteries. Lithium secondary batteries which use $LiCoO_2$ as positive active materials have been already applied practically to portable electronic devices or the like. The lithium secondary batteries have been forecasted to be also used as power secondary batteries for use in electric cars and hybrid cars. Accordingly, the development of lithium secondary batteries using $LiNiO_2$ and $LiMn_2O_4$ which are respectively inexpensive as compared with $LiCoO_2$ has been expected.

Lithium secondary batteries using lithium transition metal composition oxides as positive active materials, and carbon materials as negative active materials are generally provided with protection circuits for ensuring the safety thereof. Namely, when the lithium secondary batteries are overcharged, the voltage increases and the temperature of the interior thereof rises. Accordingly, the electrolytes may decompose to cause generation of flammable gas. To ensure the safety of such batteries in consideration that organic solvents having low flash points are used as electrolytes thereof, the lithium secondary batteries have been designed so as to stop charging before overcharging.

On the other hand, the secondary batteries as power electric sources for motor vehicles or the like are large size, and a large amount of electric current flows therein. Accordingly, the secondary batteries are required to have higher safety. The above-described protection circuits are effective in small-sized batteries for use in portable electronic devices or the like, but do not serve to sufficiently ensure the safety of large-sized batteries as power electric sources of motor vehicles on the like.

Under the above circumstances, to enhance the safety of the large-sized batteries, various trials have been made by changing the materials composing the batteries. For example, it has been proposed to enhance the thermal stability by substituting elements such as Al for one part of Ni sites in $LiNiO_2$ as positive active materials, or to make the electrolytes inflammable, using phosphoric ester, alkane fluoride, halogenated cyclic carbonate or the like, each exhibiting self-fire-extinguishing properties, as solvents. These trials or proposals, however, have not succeeded in ensuring sufficient safety.

On the other hand, thiophene, pyrrole (Publication of unexamined JP patent application No. Sho 62-160671), vinylene carbonate (Publication of unexamined JP patent application No. Hei 8-45545), sultone compounds (Publication of unexamined JP patent application No. Hei 11-339850), etc. have been proposed as additives for use in forming films on electrodes. By adding one of these additives to electrolytes, so-called cycle characteristic of the secondary batteries, that is the characteristic of restraining the lowering of the discharge capacity even after the repeated charging and discharging, is improved. However, these additives do not serve to ensure the safety of the secondary batteries.

The present inventors have analyzed the behavior of the secondary batteries during overcharging. As a result, it has become clear that when overchanging, the voltage of the secondary batteries increases and the temperature therewithin rises to cause oxidation and reduction of the electrolyte around the positive and negative electrodes, thereby generating flammable gas, and to cause emission of oxygen gas from $LiCoO_2$, $LiNiO_2$ or the like as the positive active materials, thereby causing thermorunaway of the secondary batteries, and consequently causing damage of casings thereof. Accordingly, they have earnestly studied to restrain these phenomena, thereby ensuring the safety of the secondary batteries. As a result, they have found that by protecting both the positive and negative electrodes, the reaction with the electrolyte can be restrained, and accordingly the generation of the flammable gas due to the decomposition of the electrolytes, and the emission of oxygen gas from the positive active materials can be restrained.

The present invention has been made based on their these findings.

SUMMARY OF THE INVENTION

It is an object of the present invention to provide lithium secondary batteries of very high safety, of which positive active materials are lithium transition metal composite oxides, and negative active materials are carbon materials, and which are capable of restraining both the generation of flammable gas due to the decomposition of the electrolytes, and the emission of oxygen gas from the positive active materials even during overcharging.

The lithium secondary battery in accordance with the present invention includes a positive electrode of which an active material is a lithium transition metal composite oxide, a negative electrode of which an active material is a carbon material, and a nonaqueous electrolyte which is prepared by dissolving a lithium salt in an organic solvent. The nonaqueous electrolyte contains at least one kind of conductive polymer-forming monomers which have alkyl groups, and are electrochemically polymerizable on the positive electrode within a battery operation voltage, and at least one kind of film-forming agents which electrochemically decompose within the battery operation voltage to form films on a surface of the negative electrode.

More specifically, the lithium secondary battery in accordance with the present invention is prepared by adding a specific conductive polymer-forming monomer and a specific film-forming agent to the nonaqueous electrolyte, and electrochemically polymerizing the monomer on the positive electrode while decomposing the film-forming agent on the negative electrode to form a film thereon, under normal operation states of the battery.

In the present description, "within a battery operation voltage" means "within the range of voltage for normally charging and discharging batteries" and means, as is different from the case when the battery is overcharged, or the like, charging and discharging are performed within the range of voltage which is reversibly chargeable and dischargeable. In the case of the lithium secondary battery using $LiCoO_2$, $LiNiO_2$, $LiMn_2O_4$ or the like as the positive active material, and using the carbon material as the negative active material, for example, the charging end voltage is about 4.0 to 4.2 V, and discharging end voltage is about 3.0 V. Namely, charging and discharging are performed within this voltage range.

The structure of the conductive polymer formed on the positive electrode has not been cleared up, but alkyl groups are provided therein, thereby forming polymer which exhibits flexibility. When the battery is overcharged, and the temperature therewithin rises, the polymer melts. The molten polymer covers the positive electrode to restrain the reaction with the electrolyte, whereby both the generation of flammable gas due to the oxidation of the electrolyte, and the emission of oxygen gas from the positive active material can be restrained.

The film-forming agent decomposes on the negative electrode to form a firm film on the surface of the negative electrode. The reduction of the electrolyte on the negative electrode during overcharging is considered to be resulted from that when lithium ions are doped by the carbon material as the negative active material, the organic solvent as the electrolyte is also captured by the carbon material with the lithium ions to generate interaction of the organic solvent captured and the carbon material. Accordingly, since the film thus formed exhibits a high permeability against the lithium ions, but a low permeability against the organic solvent, the solvent is restrained from entering the carbon material, and consequently, the generation of flammable gas due to the reduction of the electrolyte during overcharging can be restrained.

Accordingly, with the lithium secondary battery in accordance with the present invention, the generation of flammable gas due to the oxidation and reduction of the electrolyte during overcharging is restrained, and the emission of oxygen gas from the positive active material is restrained, too. Thus, a lithium secondary battery of very high safety is obtained.

As is apparent from the later-described experimental results, the capacity of the lithium secondary battery in accordance with the present invention does not lower greatly even after the repetition of charging and discharging cycles. Thus, the lithium secondary battery in accordance with the present invention exhibits an excellent cycle characteristic, especially at elevated temperatures. This is considered to be resulted from that by adding specific conductive polymer-forming monomer and film-forming agent to the nonaqueous electrolyte, cutting of conduction paths due to the repetition of charging and discharging cycles is restrained on the positive electrode while the self-discharging rate of the charged lithium ions is decreased on the negative electrode.

DETAILED DESCRIPTION OF THE PRESENTLY PREFERRED EXEMPLARY EMBODIMENTS

Hereinafter, conductive polymer-forming monomers, film-forming agents and other components used in the lithium secondary batteries of several embodiments of the present invention will be explained.

Conductive Polymer-forming Monomer

Examples of the conductive polymer-forming monomers having alkyl groups and capable of electrochemically polymerizing, which can be used in the lithium secondary batteries in accordance with the present invention, include cyclic compounds such as thiophene, pyrrole and selenophene. One kind or more kinds of these conductive polymer-forming monomers may be used. Especially, it is preferable to use thiophene and pyrrole, because polymerization thereof proceeds comparatively readily.

When thiophene and pyrrole are used, it is preferable to use derivatives thereof, which are provided with alkyl groups having the carbon number of 4 to 10. Where the carbon number is 3 or less, the polymerized polymer becomes harder, as compared with the case using alkyl groups of which the carbon number is within the above range, so as to become difficult to cover the positive electrode. Accordingly, when the battery is overcharged, the positive electrode may not be sufficiently protected. On the other hand, where the carbon number is 11 or more, the conductive polymer-forming monomer is difficult to electrochemically polymerize on the positive electrode, as compared with the case using alkyl groups of which the carbon number is within the above range. Accordingly, the positive electrode may not be protected sufficiently.

In the case of thiophene derivatives, reaction of the second position and fifth position thereof readily occurs to cause polymerization. For this reason, it is preferable to use the thiophene derivative which has at least one alkyl group in each of the third position and fourth position of the cyclic structure thereof. Pyrrole derivatives can have alkyl groups in the first position and third position thereof, but the pyrrole derivative which has an alkyl group in the third position is difficult to electrochemically polymerize. Accordingly, it is preferable to introduce the alkyl group in the first position of the pyrrole derivative.

The preferred content of the conductive polymer-forming monomer in a nonaqueous electrolyte ranges from 0.1 to 5 volume % against 100 volume % of the entire nonaqueous electrolyte. In the case of less than 0.1 volume %, the amount of a resultant conductive polymer is small, as compared with the case of which the monomer content is within the above-described range, and consequently the reaction of the electrolyte and the positive electrode may not be sufficiently restrained. In the case of greater than 5 volume %, the resultant conductive polymer starts to dope the lithium ions when they return to the lithium transition metal composite oxide from the carbon material so that the capacity may be decreased. In particular, in order to cover the positive electrode sufficiently, and restrain the reaction of the positive electrode and the electrolyte effectively, it is preferable to add 0.25 to 2 volume % of conductive polymer-forming monomer.

Since the conductive polymer-forming monomer readily dissolves in the electrolyte, the conductive polymer-forming monomer may be added to the electrolyte upon preparing the battery. The conductive polymer-forming monomer added upon preparing the battery electrochemically polymerizes to form a conductive polymer in the positive electrode when the potential of the positive electrode rises to a predetermined potential after charging is started. A normal charging method may be applied to the formation of the conductive polymer. In the case of the secondary battery of 4 V class, for example, the constant-current and constant-voltage charging method of charging with a constant current density to a charging end voltage of about 4.2 V and continuing charging with the charging end voltage for a predetermined period of time, may be applied. With this method, the conductive polymer can be readily formed on the positive electrode. Otherwise, by applying a constant voltage of 3 V or more to the battery for a predetermined period of time, the conductive polymer can be formed on the positive electrode, too.

As described above, with the lithium secondary battery in accordance with the present invention, the conductive polymer is electrochemically formed on the positive electrode. It can be also contemplated to mix or coat a conductive polymer which has been separately prepared with electrolytic polymerization or chemical polymerization, with or to the positive active material. With this method, however, the production steps of the lithium secondary battery itself become complex, and it is difficult to mix a very small amount of conductive polymer-forming monomer homogeneously. Accordingly, this method is not preferable. In contrast, the lithium secondary battery in accordance with the present invention can be readily produced.

Film-forming Agent

Examples of the film-forming agents for use in preparing the lithium secondary batteries in accordance with the present invention, which electrochemically decompose and form films on the surfaces of the negative electrodes, include methyl perfluorooctanate, methyl difluorobenzoate, propanesultone, butanesultone, vinylene carbonate or the like. Furthermore, one kind or more kinds of these agents may be used.

The preferred content of the film-forming agents in the nonaqueous electrolyte ranges from 0.1 to 5 volume % against 100 volume % of the entire nonaqueous electrolyte. In the case of less than 0.1 volume %, a firm film is not formed on the surface of the negative electrode, as compared with the case within the preferred range, whereby the reaction of the electrolyte and the negative electrode may not be sufficiently restrained. In the case of more than 5 volume %, the decomposition amount of the film-forming agent is larger than that of the case within the preferred range, and accordingly, the thickness of the film formed on the negative electrode becomes great to increase the resistance during charging and discharging. Consequently, the lowering of the capacity may occur. In particular, in order to cover the negative electrode sufficiently, and restrain the reaction of the negative electrode and electrolyte effectively, it is preferable to add 0.25 to 2 volume % of the film-forming agent.

Since the film-forming agent readily dissolves in the electrolyte, the film-forming agent may be added to the electrolyte upon preparing the battery. When the electric potential of the negative electrode drops to about 1.5 V (against Li/Li$^+$) after charging is started, the film-forming agent added upon preparing the battery electrochemically decomposes and forms films on the surface of the negative electrode. With respect to the forming method, a normal charging method may be applied, similarly to the above-described forming method of the conductive polymer.

Other Components of the Lithium Secondary Battery

The lithium secondary battery in accordance with the present invention includes a positive electrode of which an active material is a lithium transition metal composite oxide, a negative electrode of which an active material is a carbon material, and a nonaqueous electrolyte prepared by dissolving a lithium salt in an organic solvent. Other components than the above-described conductive polymer-forming monomer and the film-forming agent which are to be added to the nonaqueous electrolyte are not limited specifically, and may be similar to those used in already existing normal lithium secondary batteries. One example thereof will be explained.

The positive electrode can be formed by mixing a conductive material and a binder with a positive active material which is capable of doping and undoping lithium ions, adding a proper solvent to a resultant mixture to form a paste-like positive electrode material, applying the formed paste-like positive electrode material to a surface of a current collector made of metallic foil such as aluminum foil, and after drying, if necessary, compressing a resultant film to increase the electrode density. In this case, applying, drying and compressing operations may be performed by normal methods.

Lithium transition metal composite oxides are used as the positive active material. The preferred examples of the lithium transition metal composite oxides include a lithium cobalt composite oxide and a lithium nickel composite oxide, each having a basic composition of $LiCoO_2$ or $LiNiO_2$ and a layered rock-salt structure, and a lithium manganese composite oxide having a basic composition of $LiMn_2O_4$ and a spinel structure.

In particular, it is preferable to use the lithium nickel composite oxide having the basic composition of $LiNiO_2$ and the layered rock-salt structure, because $LiNiO_2$ is inexpensive as compared with $LiCoO_2$ and can compose secondary batteries of great capacities. In addition, the material cost of lithium manganese composite oxide mainly composed of $LiMn_2O_4$ and having a spinel structure is most inexpensive out of the above-described lithium transition metal composite oxides, and is very advantageous when applied to electric sources for use in electric cars, or the like, which need a large amount of active materials. Accordingly, by using a mixture of the lithium nickel composite oxide mainly composed of $LiNiO_2$ and having the layered rock-salt structure and the lithium manganese composite oxide mainly composed of $LiMn_2O_4$ and having the spinel structure, defects of the lithium nickel composite oxide, such as slightly inferior thermal stability or the like, are complemented by the lithium manganese composite oxide, whereby inexpensive secondary batteries having great capacities can be provided.

In this case, "basic composition" means the representative composition of each composite oxide, and includes the composition expressed by the above-described composition formula, the composition where one or more kinds of other elements such as Al and Fe is substituted for one part of the lithium sites, transition metal sites and the like thereof. In addition, the basic composition is not always limited to the stoichiometry composition, but also includes nonstoichiometry composition wherein cation atoms of lithium, transition metal or the like, or oxygen atoms are lost, which is inevitably generated during the production thereof, for example. In addition, one of the above-described lithium transition metal composite oxides or a mixture of two or more thereof can be used.

The conductive material is used to ensure the electroconductive properties of the positive electrode. For example, one kind or a mixture of two or more kinds of powdered carbon materials such as carbon black, acetylene black or graphite can be used as the conductive material. The binder acts to link particles of the active materials and conductive materials. For example, fluorine-containing resins such as polytetrafluoroethylene, polyvinylidene fluoride and fluoro rubber, and thermoplastic resins such as polypropylene and polyethylene can be used. Organic solvents such as N-methyl-2-pyrrolidone can be used as the solvent for dispersing these active materials, conductive materials and binders.

The negative electrode can be produced by mixing a binder to a negative active material, adding a proper solvent to a resultant mixture to obtain a paste-like negative electrode material, applying the paste-like negative electrode material to a surface of a current collector composed of metallic foil such as copper foil, drying and pressing the applied paste-like negative electrode material. In this case, normal applying, drying and pressing methods may be used.

The negative active material is composed of a carbon material capable of doping and undoping lithium ions therein and therefrom. Examples of the carbon material include natural or artificial graphite, carbon which is difficult to graphitize, burned bodies of organic compounds such as phenol resins, and powdery bodies of coke or the like. And fluorine-containing resins such as polyvinylidene fluoride can be used as the binder, and organic solvents such as N-methyl-2-pyrrolidone can be used as the solvents, similarly to the positive electrode.

A separator is interposed between the positive electrode and negative electrode for separating the positive electrode and negative electrode from each other and retaining the electrolyte. Thin micro-porous films composed of polyethylene, polypropylene or the like can be used.

The nonaqueous electrolyte is prepared by dissolving lithium salts as supporting salts in the organic solvent. In addition, a radical capturing agent, surface active agent, flame retardant agent or the like may be contained. When the lithium salts dissolve in the organic solvent, the lithium salts dissociate and exist in the electrolyte as lithium ions. Examples of the lithium salts include $LiBF_4$, $LiPF_6$, $LiClO_4$, $LiCF_3SO_3$, $LiAsF_6$, $LiN(CF_3SO_2)_2$, $LiN(C_2F_5SO_2)_2$ or the like, and composite salts of these lithium salts. These lithium salts may be used solely or two or more kinds thereof can be used in combination.

A non-proton organic solvent is used as the organic solvent for dissolving the lithium salts. The non-proton organic solvent is composed of a mixture of one or more kinds of cyclic carbonate, alkyl carbonate, cyclic ester, cyclic ether, ether, phosphazene compounds and phosphate compounds. Examples of the cyclic carbonate include ethylene carbonate, propylene carbonate, butylene carbonate, vinylene carbonate or the like, and examples of the alkyl carbonate include dimethyl carbonate, diethyl carbonate, ethyl methyl carbonate or the like. Examples of the cyclic ester include γ-butyrolactone, γ-valerolactone, or the like. Examples of the cyclic ether include tetrahydrofuran, 2-methyl tetrahydrofuran or the like. Examples of the chain ether include dimethoxyethane, ethylene glycol dimethyl ether or the like, and examples of the phosphazene compounds include hexaetoxytricyclophosphazene, tripropoxyphophazophosphonyldipropoxyde or the like. Examples of the phosphate compounds include triocthyl phosphate, tributyl phosphate or the like. These materials can be used solely or two or more kinds thereof can be used in combination.

The electrolyte is required to exhibit a high relative dielectric constant for promoting the dissociation of the lithium salts as the supporting salts, and is required to exhibit a low viscosity for preventing blocking of moving of the lithium ions. Propylene carbonate is preferable as the solvent, because it exhibits the above-described two properties. But propylene carbonate is highly reactive with the carbon material, and consequently it is difficult to use solely. Accordingly, when propylene carbonate is used, it is desirable to use a mixture of propylene carbonate and other organic solvents such as dimethyl carbonate, hexaetoxytricyclophosphazene or the like. In other embodiments, it is desirable to use a mixture of and ethylene carbonate or the like, which exhibits high relative dielectric constants, and diethyl carbonate or the like, which exhibits low viscosity.

The lithium secondary battery constructed with the above-described components can take various configurations such as a cylindrical type, layered type, coin type or the like. In any type of configuration, a separator is provided between the positive electrode and negative electrode to define an electrode body. A positive electrode current collector is connected to a positive electrode terminal which is led to the outside while a negative electrode current collector is connected to a negative electrode terminal which is led to the outside, using leads for use in collecting current, or the like. A resultant electrode body is impregnated with the nonaqueous electrolyte, and is sealed within a battery casing, thereby completing the lithium secondary battery.

Other Embodiments

An embodiment of the lithium secondary battery in accordance with the present invention has been explained. This embodiment is one of several embodiments of the present invention, and the lithium secondary battery of the present invention can take various embodiments including the above-described embodiment. The present invention can be variously modified and improved based on the knowledge of one having ordinary skill in the art.

Experiments

In order to examine the operational advantages resulting from the addition of the conductive polymer-forming monomer and film-forming agent, various experiments were conducted. Hereinafter, they will be explained.

Experiment A

A secondary battery prepared by adding a conductive polymer-forming monomer and a film-forming agent to a nonaqueous electrolyte, a secondary battery prepared by adding one of the conductive polymer-forming monomer and the film-forming agent to the nonaqueous electrolyte, and a secondary battery prepared without adding any one of them to the nonaqueous electrolyte were respectively subjected to overcharging tests to evaluate the safety of the secondary batteries.

(1) Preparation of Lithium Secondary Batteries

A lithium nickel composite oxide having a layered rock-salt structure, which was represented by the composition formula of $LiNiO_2$, was used as the positive active material. First, a paste-like positive electrode material was prepared by mixing 85 parts by weight of the above-described lithium nickel composite oxide as the positive active material, 10 parts by weight of artificial graphite as a conductive material and 5 parts by weight of polyvinylidene fluoride as a binder together, and adding a proper amount of N-methyl-2-pyrrolidone as a solvent. Next, the paste-like positive electrode material was applied to both sides of an aluminum foil current collector having a thickness of 20 μm, dried, and then compressed by means of a roll press to obtain a sheet-like positive electrode material, which has a thickness of 130 μm, on each side of the aluminum foil current collector.

Graphitized mesocarbone microbeads (MCMB) were used as an active material of a negative electrode which faces a positive electrode. First, a paste-like negative electrode material was prepared by mixing 94 parts by weight of graphitized mesocarbone microbeads (MCMB) as the negative active material with 6 parts by weight of polyvinylidene fluoride as a binder, and adding a proper amount of N-methyl-2-pyrrolidone as a solvent. Next, the paste-like negative electrode material was applied to both sides of a copper foil current collector having a thickness of 15 μm, dried, and then compressed by means of a roll press to obtain a sheet-like negative electrode material, which had a thickness of 82 μm, on each side of the copper foil current collector.

A separator composed of polyethylene and having a thickness of 25 μm and a width of 55 mm was put between thus prepared positive electrode and negative electrode and wound to obtain a roll-like electrode body. Next, the roll-like electrode body was inserted in a cylindrical battery casing of 18650 type (outside diameter: 18 mmφ, length: 65 mm), a nonaqueous electrolyte was poured therein, and the cylindrical battery casing was sealed to obtain a cylindrical lithium secondary battery. The nonaqueous electrolyte was prepared by dissolving $LiPF_6$ in a mixture solvent obtained by mixing ethylene carbonate and diethyl carbonate in the volume ratio of 3:7, with a concentration of 1M, and adding 0.5 volume % of 3-hexylthiophene (3HT) as a conductive polymer-forming monomer, and 0.4 volume % of methyl perfluorooctanate (MPO) as a film forming agent. A safety valve was provided at the bottom of the battery casing so as to open to release gas from the interior of the battery when the inner pressure of the battery exceeded a predetermined value.

The thus prepared lithium secondary battery was subjected to experiments as a secondary battery of Embodiment A. And, for comparison, another secondary battery was prepared using an electrolyte which does not contain any conductive polymer-forming monomer and any film-forming agent as a secondary battery of Comparative example A1. In addition, two secondary batteries were prepared using an electrolyte which contains only MPO as the film-forming agent, and an electrolyte which contains only 3HT as the conductive polymer-forming monomer, respectively, as secondary batteries of Comparative examples A2 and A3.

(2) Preliminary Charging of Batteries

Preliminary charging of the secondary batteries of Embodiment A and Comparative examples A1 to A3 was performed under the conditions that each secondary battery was charged to 4.1 V with a constant current having a current density of 1.0 $mA/cm^2$ at 25° C., and charged continuously with a constant voltage of 4.1 V until the total charging time of 2.5 hours passed. After resting for 10 minutes, discharging was started and continued with a constant current having a current density of 1.0 $mA/cm^2$ until the voltage decreased to 3.0 V. These operations were repeated thrice, and then, a fourth charging operation was performed. Thus, the preliminary charging was finished.

(3) Overcharging Test

The secondary batteries of Embodiment A and Comparative examples A1 to A3, which had been preliminarily charged, respectively, were charged continuously with currents of 0.5 A, 1.0 A, 2.0 A and 5.0 A, respectively, at 25° C. with the voltage finally fixed to 10 V. Then, each secondary battery was left for 15 minutes or more with at least 10 V, and the variation thereof was observed.

(4) Evaluation of the Safety of the Secondary Batteries

The safety of the secondary batteries was evaluated in accordance with the opening of the safety valves and the existence of damage of the battery casings. Opening of the valve is the phenomenon that the safety valve opens when the internal pressure of the battery exceeds a predetermined value. The evaluation results are shown in TABLE 1.

TABLE 1

| | Additive | | Safety | |
| | Conductive polymer-forming monomer | Film-forming agent | Electric current (A) | Opening of valve | Damage of casing |
| --- | --- | --- | --- | --- | --- |
| Embodiment A | 3HT | MPO | 0.5 | ○ | ○ |
| | | | 1.0 | X | ○ |
| | | | 2.0 | X | ○ |
| | | | 5.0 | X | ○ |
| Comparative example A1 | No addition | No addition | 0.5 | ○ | ○ |
| | | | 1.0 | X | X |
| | | | 2.0 | X | X |
| | | | 5.0 | X | X |
| Comparative example A2 | No addition | MPO | 1.0 | X | X |
| | | | 5.0 | X | X |
| Comparative example A3 | 3HT | No addition | 1.0 | X | X |
| | | | 5.0 | X | X |

※ Positive active material: $LiNiO_2$,
Solvent of electrolyte: EC/DEC

In TABLE 1, symbol ○ indicates that no evaluation item occurred, and X indicates that the evaluation item occurred. As is apparent from TABLE 1, by charging with an electric current as small as 0.5 A, there was no change in each secondary battery, and accordingly, each secondary battery was regarded safe. In contrast, by charging with an electric current as great as 1.0 A or more, only the secondary battery of Embodiment A was free from damage of the casing, and exhibited improved safety. From these results, it could be confirmed that the lithium secondary battery in accordance with the present invention, which was prepared by adding both the conductive polymer-forming monomer and the film-forming agent to the electrolyte, was a secondary battery exhibiting extremely high safety even during overcharging.

Experiment B

Secondary batteries prepared by adding various kinds of conductive polymer-forming monomers and film-forming agents to nonaqueous electrolytes in various ratios were respectively subjected to overcharging tests, similarly to Experiment A to evaluate the safety of the secondary batteries.

(1) Preparation of Lithium Secondary Batteries

Secondary batteries were prepared by varying the kind and composition ratio of each of the conductive polymer-forming monomer and the film-forming agent in the secondary battery of Embodiment A, which was used in Experiment A, as follows. Namely, the secondary battery of Embodiment B1 was prepared by varying the composition ratio of 3HT to 1.0 volume %, the secondary battery of Embodiment B2 was prepared by varying 3HT to 3-octhylthiophene (3OT), the secondary battery of Embodiment B3 was prepared by varying 3HT to 1-octhylpyrrole (1OP), and varying the composition ratio thereof to 0.25 volume %, the secondary battery of Embodiment B4 was prepared by varying MPO to methyl difluorobenzoate (MDFB), and varying the composition ratio thereof to 0.25 volume %, the secondary battery of Embodiment B5 was prepared by varying MPO to propanesultone (PS), and varying the composition ratio thereof to 2 volume %, the secondary battery of Embodiment B6 was prepared by varying MPO to vinylene carbonate(VC), and varying the composition ratio thereof to 2 volume %, the secondary battery of Comparative example B1 was prepared by varying 3HT and MPO to only VC as the film-forming agent, and varying the composition ratio thereof to 2 volume %, and the secondary battery of Comparative example B2 was prepared by varying 3HT and MPO to only 1,4-butane sultone (BS) as the film-forming agent, and varying the composition ratio thereof to 2 volume %.

(2) Preliminary Charging of Batteries

Preliminary charging of the secondary batteries of Embodiments B1 to B6, and Comparative examples B1 and B2 was performed under the conditions similar to those of Experiment A.

(3) Overcharging Test

The secondary batteries of Embodiments B1 to B6, and Comparative examples B1 and B2, which had been preliminarily charged, were charged continuously with an electric current of 5.0 A at 25° C. with the voltage finally fixed to 10 V. Then, the secondary batteries were left for 15 minutes or more with at least 10 V, and the variation thereof was observed.

(4) Evaluation of the Safety of the Secondary Batteries

The safety of the secondary batteries was evaluated, similarly to Experiment A. The evaluation results are shown in TABLE 2.

TABLE 2

| | Additive [Kind: Ratio(vol. %)] | | Safety | |
|---|---|---|---|---|
| | Conductive polymer-forming monomer | Film-forming agent | Opening of valve | Damage of casing |
| Embodiment B1 | 3HT: 1.0 | MPO: 0.4 | X | ○ |
| Embodiment B2 | 3OT: 0.5 | MPO: 0.4 | X | ○ |
| Embodiment B3 | 10P: 0.25 | MPO: 0.4 | X | ○ |
| Embodiment B4 | 3HT: 0.5 | MDFB: 0.25 | X | ○ |
| Embodiment B5 | 3HT: 0.5 | PS: 2.0 | X | ○ |
| Embodiment B6 | 3HT: 0.5 | VC: 2.0 | X | ○ |
| Comparative example B1 | No addition | VC: 2.0 | X | X |
| Comparative example B2 | No addition | BS: 2.0 | X | X |

※ Positive active material: $LiNiO_2$,
Solvent of electrolyte: EC/DEC

In TABLE 2, symbol ○ indicates that no evaluation item occurred, and symbol X indicates that the evaluation item occurred. As is apparent from TABLE 2, opening of valve occurred in each secondary battery, because charging was performed with an electric current as great as 5.0 A. However, in the secondary batteries of Comparative examples B1 and B2, which contain only one of the conductive polymer-forming monomer and the film-forming agent, damage of the casings occurred. In contrast, the secondary batteries of Embodiments B1 to B6 were free from damage of the casings thereof irrespective of the kind and the composition ratio of the added conductive polymer-forming monomer and film-forming agent. These results show that the safety of the secondary batteries was improved. Accordingly, it could be confirmed that the lithium secondary battery in accordance with the present invention, which was prepared by adding both the conductive polymer-forming monomer and the film-forming agent to the electrolyte, was a secondary battery exhibiting very high safety even during overcharging with a great electric current. In addition, it could be confirmed that the preferred conductive polymer-forming monomer to be added was at least one of a derivative of thiophene, which was provided with at least one alkyl group having the carbon number of 4 to 10 in a third or fourth position of a cyclic structure thereof, and a derivative of pyrrole, which was provided with an alkyl group having the carbon number of 4 to 10 in a first position of the cyclic structure thereof.

Experiment C

This experiment was performed to confirm the operational advantage resulting from the addition of the conductive polymer-forming monomer and the film-forming agent, which depended on the difference in solvents to be used in electrolytes.

(1) Preparation of Lithium Secondary Batteries

A secondary battery of Embodiment C1 was prepared by changing the solvent which had been used in the electrolyte of the secondary battery of Embodiment A in Experiment A to a mixture solvent prepared by mixing ethylene carbonate (EC), diethyl carbonate (DEC) and triocthyl phosphate in the volume ratio of 1:1:1. Another secondary battery of Comparative example C1 was prepared without adding any conductive polymer-forming monomer or film-forming agent to the electrolyte of the secondary battery of Embodiment C1, and still another secondary battery of Comparative example C2 was prepared by adding only MPO (0.4 volume %) to the electrolyte of the secondary battery of Embodiment C1. On the other hand, a secondary battery of Embodiment C2 was prepared by changing the solvent which had been used in the electrolyte of the secondary battery of Embodiment A to a mixture solvent prepared by mixing propylene carbonate (PC), hexaethoxytricyclophosphazene (PN) and dimethyl carbonate (DMC) in the volume ratio of 1:2:2. In addition, a secondary battery of Comparative example C3 was prepared by changing the solvent which had been used in the electrolyte of the secondary battery of Embodiment A to a mixture solvent prepared by mixing ethylene carbonate (EC), diethyl carbonate (DEC) and tributyl phosphate in the volume ratio of 1:1:1 without adding any conductive polymer-forming monomer of film-forming agent.

(2) Preliminary Charging of Batteries

Preliminary charging of the secondary batteries of Embodiments C1 and C2, and Comparative examples C1 to C3 was performed under the conditions similar to those in Experiment A.

(3) Overcharging Test

The secondary batteries of Embodiments C1 and C2, and Comparison examples C1 to C3, which had been preliminarily charged, were charged continuously with an electric current of 5 Å at 25° C. with the voltage finally fixed to 10 V. Then, each secondary battery was left for 15 minutes or more with at least 10 V, and the variation thereof was observed.

(4) Evaluation of the Safety of the Secondary Batteries

The safety of each secondary battery was evaluated, similarly to Experiment A. The evaluation results are shown in TABLE 3.

TABLE 3

| | Additive [Ki Ratio(vol. %)] | | | Safety | |
|---|---|---|---|---|---|
| | Solvent of electrolyte | Conductive polymer-forming monomer | Film-forming agent | Opening of valve | Damage of casing |
| Embodiment C1 | EC/DEC/ triocthyl phosphate | 3HT: 0.5 | MPO: 0.4 | X | ○ |
| Embodiment C2 | PC/PN/ DMC | 3HT: 0.5 | MPO: 0.4 | ○ | ○ |
| Comparative example C1 | EC/DEC/ triocthyl phosphate | No addition | No addition | X | X |
| Comparative example C2 | EC/DEC/ triocthyl phosphate | No addition | MPO: 0.4 | X | X |
| Comparative example C3 | EC/DEC/ tributhyl phosphate | No addition | No addition | X | X |

※ Positive active material: $LiNiO_2$

In TABLE 3, symbol ○ indicates that no evaluation item occurred, and symbol X indicates that the evaluation item occurred. As is apparent from TABLE 3, in the secondary batteries of Comparative examples C1 to C3, which contain neither the conductive polymer-forming monomer nor the film forming agent, damage of the casings occurred irrespective of the kinds of the solvent to be used in the electrolytes. In contrast, the secondary batteries of Embodiments C1 and C2 were free from damage of the casings thereof. These results show that the safety of the secondary batteries of Embodiments C1 and C2 was improved. In addition, in the secondary battery of Embodiment C2, opening of the valve is also restrained in spite of charging being performed with an electric current as great as 5.0 A. This result is considered to be caused by hexaethoxy tricyclophosphazene (PN) having high fire resistance being used in the electrolyte of the secondary battery of Embodiment C2 as one of the solvents. Accordingly, it could be confirmed that the lithium secondary battery in accordance with the present invention, which was prepared by adding both the conductive polymer-forming monomer and the film-forming agent to the electrolyte, was a secondary battery exhibiting very high safety even during overcharging with a great electric current, irrespective of the kind of the solvent to be used in the electrolyte. In addition, it could be confirmed that the safety of the secondary battery was further improved by using the solvent which had high fire resistance.

Experiment D

This experiment was performed to confirm the operational advantage resulting from the addition of the conductive polymer-forming monomer and the film-forming agent in the lithium secondary batteries including various positive active materials.
(1) Preparation of Lithium Secondary Batteries
A secondary battery of Embodiment D was prepared by changing the positive active material which had been used in the secondary battery of Embodiment A in Experiment A to a mixture prepared by mixing a lithium nickel composite oxide having a layered rock-salt structure, which was represented by the composition formula of $LiNiO_2$, and a lithium manganese composite oxide having a spinel structure, which was represented by the composition formula of $LiAl_{0.2}Mn_{1.8}O_4$, in the weight ratio of 20:80. Another secondary battery of Comparative example D was prepared without adding any conductive polymer-forming monomer or film-forming agent to the electrolyte of the secondary battery of Embodiment D.
(2) Preliminary Charging of Batteries
Preliminary charging of the secondary batteries of Embodiment D and Comparative example D was performed under the conditions similar to those in Experiment A.
(3) Overcharging Test
The secondary batteries of Embodiment D and Comparative example D which had been preliminarily charged, were charged continuously with an electric current of 5.0 A at 25° C. with the voltage finally fixed to 10 V. Then, each secondary battery was left for 15 minutes or more with at least 10 V, and the variation thereof was observed.
(4) Evaluation of the Safety of Battery
The safety of each battery was evaluated, similarly to Experiment A. The evaluation results are shown in TABLE 4.

TABLE 4

| | | Additive [Ki Ratio(vol. %)] | | Safety | |
|---|---|---|---|---|---|
| | Positive active material | Conductive polymer-forming monomer | Film-forming agent | Opening of valve | Damage of casing |
| Embodiment D | $LiNiO_2$/ $LiAl_{0.2}Mn_{1.8}O_4$ | 3HT: 0.5 | MPO: 0.4 | X | ○ |
| Comparative example D | $LiNiO_2$/ $LiAl_{0.2}Mn_{1.8}O_4$ | No addition | No addition | X | X |

※ Solvent of electrolyte: EC/DEC

In TABLE 4, symbol ○ indicates that no evaluation item occurred, and symbol X indicates that the evaluation item occurred. As is apparent from TABLE 4, in the secondary batteries of Embodiment D and Comparative example D, opening of the valve occurred, because charging was performed with an electric current as great as 5.0 A. However, in the secondary battery of Comparative example D, which contains neither conductive polymer-forming monomer nor film-forming agent, damage of the casing occurred, whereas the secondary battery of Embodiment D was free from damage of the casing thereof. These results show that the safety of the secondary battery of Embodiment D was improved. Accordingly, it could be confirmed that the lithium secondary battery in accordance with the present invention, which was prepared by adding the conductive polymer-forming monomer and the film-forming agent to the electrolyte, was a secondary battery exhibiting very high safety even during overcharging with a great electric current, irrespective of the kind of the lithium transition metal composite oxide as the positive active material.

Experiment E

This experiment was performed to confirm the operational advantage resulting from the addition of the conductive polymer-forming monomer and the film-forming agent after charging and discharging cycles.
(1) Lithium Secondary Batteries Used in the Present Experiment
The secondary batteries used in the present experiment are four kinds of secondary batteries of Embodiment A and Comparative example A1, which were identical to those in Experiment A, and Embodiment D and Comparative example D, which were identical to those in Experiment D. More specifically, the secondary batteries of Embodiments A and D are nonaqueous secondary batteries containing both the conductive polymer-forming monomer and film-forming agent, and different positive electrode active materials, and the secondary batteries of Comparative examples A1 and D are secondary batteries, each containing neither conductive polymer-forming monomer nor film-forming agent.

(2) Charging and Discharging Cycle Test

The secondary batteries of Embodiments A and D, and Comparative examples A1 and D were subjected to the charging and discharging cycle test. The conditions of the test are as follows. Namely, charging was performed at 60° C. with a constant current having a current density of 1.0 mA/cm$^2$ to a charging upper limit voltage of 4.1 V, and next, discharging was performed with a constant current having a current density of 1.0 mA/cm$^2$ to a discharging lower limit voltage of 3.0 V. This cycle of charging and discharging operations was repeated 500 times.

(3) Overcharging Test

The secondary batteries which had been subjected to the charging and discharging cycle test were charged continuously with an electric current of 5.0 Å at 25° C. and finally, the voltage was fixed to 10 V. Then, each secondary battery was left for 15 minutes or more with at least 10 V, and the variation thereof was observed.

(4) Evaluation of the Safety of the Secondary Battery

The safety of each secondary battery was evaluated, similarly to Experiment A. The evaluation results are shown in TABLE 5.

TABLE 5

|  | Positive active material | Additive [Ki Ratio(vol. %)] | | Safety | |
|---|---|---|---|---|---|
|  |  | Conductive polymer-forming monomer | Film-forming agent | Opening of valve | Damage of casing |
| Embodiment A | LiNiO$_2$ | 3HT: 0.5 | MPO: 0.4 | ○ | ○ |
| Embodiment D | LiNiO$_2$/ LiAl$_{0.2}$Mn$_{1.8}$O$_4$ | 3HT: 0.5 | MPO: 0.4 | ○ | ○ |
| Comparative example A1 | LiNiO$_2$ | No addition | No addition | X | X |
| Comparative example D | LiNiO$_2$/ LiAl$_{0.2}$Mn$_{1.8}$O$_4$ | No addition | No addition | X | X |

※ Solvent of electrolyte: EC/DEC

In TABLE 5, symbol ○ indicates that no evaluation item occurred, and symbol X indicates that the evaluation item occurred. As is apparent from TABLE 5, in the secondary batteries of Comparative examples A1 and D, which contain neither the conductive polymer-forming monomer nor the film-forming agent, opening of the valve occurred, and damage of the casings occurred. In contrast, the secondary batteries of Embodiments A and D were free from both opening of the valve and damage of the casing thereof. These results show that the secondary batteries of Embodiments A and D are secondary batteries exhibiting very high safety even after the charging and discharging cycle test, irrespective of the positive active material. In addition, upon additionally examining, the capacity retaining rate of the secondary battery of Embodiment A was 81%, that of Comparative example A1 was 74%, that of embodiment D was 65%, and that of Comparative example D was 54%. These results show that the addition of the conductive polymer-forming monomer and the film-forming agent is effective in improving the cycle characteristic of the secondary battery, especially at elevated temperatures. Accordingly, it could be confirmed that the lithium secondary battery in accordance with the present invention, which was prepared by adding the conductive polymer-forming monomer and the film-forming agent to the electrolyte, was a secondary battery exhibiting very high safety even after the repetition of charging and discharging cycles, irrespective of the kind of the lithium transition metal composite oxide as the positive active material. Furthermore, it could be confirmed that the cycle characteristic of the secondary battery, especially at elevated temperatures, were also good.

With the lithium secondary battery in accordance with the present invention, by adding a specific conductive polymer-forming monomer and a specific film-forming agent to a nonaqueous electrolyte to protect the positive electrode and the negative electrode, the generation of flammable gas due to the oxidation and reduction of the electrolyte during overcharging is restrained, and the emission of oxygen gas from the positive active material is also restrained, thereby serving as a lithium secondary battery having very high safety.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A lithium secondary battery comprising:
    a positive electrode of which an active material is a lithium transition metal composite oxide;
    a negative electrode of which an active material is a carbon material; and
    a nonaqueous electrolyte composed of an organic solvent in which a lithium salt is dissolved, said non aqueous electrolyte containing at least one kind of conductive polymer-forming monomers which have an alkyl group and are electrochemically polymerizable on said positive electrode within a battery operation voltage, and at least one kind of film-forming agents which electrochemically decompose within said battery operation voltage to form films on a surface of said negative electrode.

2. A lithium secondary battery as claimed in claim 1, wherein said at least one kind of conductive polymer-forming monomers is added in the ratio of 0.1 to 5 volume %.

3. A lithium secondary battery as claimed in claim 2, wherein said at least one kind of conductive polymer-forming monomers is added in the ratio of 0.25 to 2 volume %.

4. A lithium secondary battery as claimed in claim 1, wherein said conductive polymer-forming monomers include at least one kind of derivatives of thiophene and derivatives of pyrrole, each having an alkyl group of which the carbon number is 4 to 10.

5. A lithium secondary battery as claimed in claim 4, wherein said conductive polymer-forming monomers include at least one kind of derivatives of pyrrole, having an alkyl group of which the carbon number is 4 to 10.

6. A lithium secondary battery as claimed in claim 4, wherein said conductive polymer-forming monomers include at least one kind of derivatives of thiophene, having an alkyl group of which the carbon number is 4 to 10.

7. A lithium secondary battery as claimed in claim 6, wherein said at least one kind of derivatives of thiophene is 3-hexyl thiophene.

8. A lithium secondary battery as claimed in claim 1, wherein said at least one kind of film-forming agents is added in the ratio of 0.1 to 5 volume %.

9. A lithium secondary battery as claimed in claim 8, wherein said at least one kind of film-forming agents is added in the ratio of 0.25 to 2 volume %.

10. A lithium secondary battery as claimed in claim 1, wherein said film-forming agents are at least one kind of methyl perfluorooctanate, methyl difluorobenzoate, propane sultone, 1,4-butane sultone and vinylene carbonate.

11. A lithium secondary battery as claimed in claim 10, wherein said film-forming agents include methyl perfluorooctanate.

12. A lithium secondary battery as claimed in claim 1, wherein said lithium transition metal composite oxide is a lithium nickel composite oxide having a basic composition of $LiNiO_2$ and a layered rock-salt structure.

13. A lithium secondary battery as claimed in claim 1, wherein said lithium transition metal composite oxide is a mixture of a lithium nickel composite oxide having a basic composition of $LiNiO_2$ and a layered rock-salt structure, and a lithium manganese composite oxide having a basic composition of $LiMn_2O_4$ and a spinel structure.

14. A lithium secondary battery as claimed in claim 1, wherein said organic solvent is a mixture of propylene carbonate, dimethyl carbonate and hexaetoxy tricyclo phosphazene.

15. A lithium secondary battery as claimed in claim 1, wherein said organic solvent is a mixture of propylene carbonate and ethylene carbonate.

* * * * *